United States Patent
Kaphengst et al.

(10) Patent No.: US 12,504,762 B2
(45) Date of Patent: Dec. 23, 2025

(54) SYSTEM TO USE AUTONOMOUS ROBOT ERGONOMIC SWARM RAMPS

(71) Applicant: GM GLOBAL TECHNOLOGY OPERATIONS LLC, Detroit, MI (US)

(72) Inventors: Michael R Kaphengst, Leonard, MI (US); Alfred Manser, White Lake, MI (US); Joshua Lee Solomon, Berkley, MI (US); Seog-Chan Oh, Troy, MI (US); Miguel Arturo Saez, Clarkston, MI (US); Ahmad Almarkhi, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 232 days.

(21) Appl. No.: 18/356,466

(22) Filed: Jul. 21, 2023

(65) Prior Publication Data

US 2025/0028324 A1    Jan. 23, 2025

(51) Int. Cl.
*B23P 21/00* (2006.01)
*G05D 1/00* (2006.01)
*G06F 21/32* (2013.01)

(52) U.S. Cl.
CPC ......... *G05D 1/0287* (2013.01); *G05D 1/0217* (2013.01); *G06F 21/32* (2013.01)

(58) Field of Classification Search
CPC ..... G05D 1/0217; G05D 1/0287; G06F 21/32
See application file for complete search history.

(56) References Cited

U.S. PATENT DOCUMENTS

| | | | |
|---|---|---|---|
| 11,953,905 B1* | 4/2024 | Lathia | G05D 1/0206 |
| 2022/0219441 A1* | 7/2022 | Tiramani | B32B 15/043 |
| 2023/0368681 A1* | 11/2023 | Altus | G06Q 10/047 |
| 2024/0262399 A1* | 8/2024 | Fenile | B65G 17/20 |

* cited by examiner

*Primary Examiner* — Masud Ahmed
(74) *Attorney, Agent, or Firm* — Ingrassia Fisher & Lorenz, LLP | IF&L

(57) ABSTRACT

Methods and systems are provided that include one or more sensors configured to obtain biometric information as to one or more individuals who are to assist with manufacturing of a vehicle; a non-transitory computer readable storage medium configured to store operational requirements for the manufacturing of the vehicle; and a processor that is configured to at least facilitate providing instructions for creating a swarm ramp on which the vehicle is to be placed in order to provide an ergonomic work envelope for the one or more individuals, based on the biometric information and the operational requirements.

20 Claims, 6 Drawing Sheets

SYSTEM TO USE AUTONOMOUS ROBOT ERGONOMIC SWARM RAMPS

TECHNICAL FIELD

The technical field generally relates to vehicles and, more specifically, to systems for manufacturing vehicles using autonomous robot ergonomic swarm ramps.

BACKGROUND

Vehicles today are often manufactured at manufacturing facilities that include various individuals who assist with the manufacturing of the vehicles. However, existing systems may not always provide for optimal manufacturing of the vehicles, for example with respect to ergonomic considerations for the individuals assisting with the manufacturing of the vehicles.

Accordingly, it is desirable to provide improved methods and systems for controlling manufacturing of vehicles, including with respect to ergonomic considerations for the individuals assisting with the manufacturing of the vehicles. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes obtaining, via one or more sensors, biometric information as to one or more individuals who are to assist with manufacturing of a vehicle; obtaining, via a non-transitory computer readable storage medium, operational requirements for the manufacturing of the vehicle; and providing instructions, via a processor, for creation of a swarm ramp on which the vehicle is to be placed in order to provide an ergonomic work envelope for the one or more individuals, based on the biometric information and the operational requirements.

Also in an exemplary embodiment, the swarm ramp includes a plurality of ramp components and a plurality of autonomous mobile robots (AMRs) that are configured to be coupled to the ramp components, and the method further includes forming the swarm ramp, in accordance with the instructions provided by the processor, by automated movement of the ramp components into position and nesting of the ramp components together as directed by the AMRs.

Also in an exemplary embodiment, the automated movement of the ramp components and the nesting of the ramp components together are both performed at a pre-stage location, and the swarm ramp then travels as a unit to a manufacturing location.

Also in an exemplary embodiment, the automated movement of the ramp components occurs separately for each of the ramp components until the ramp components reach a manufacturing location, and the nesting is then performed at the manufacturing location.

Also in an exemplary embodiment, the swarm ramp is configured based at least in part on heights of the one or more individuals based on the biometric information.

Also in an exemplary embodiment, the swarm ramp is configured also based at least in part on a manufacturing operation working pitch based on the operational requirements.

Also in an exemplary embodiment, the swarm ramp is configured also based at least in part on an operational length, an operational height, a number of ramp components, and designated lead ramp components, follow ramp components, and end ramp components.

Also in an exemplary embodiment, the method further includes calculating, via the processor, an amount of time required for travel of the ramp components to a destination for nesting; and determining, via the processor, an optimized route for travel of the ramp components based on the amount of time.

Also in an exemplary embodiment, the method also includes determining, via the processor, whether any issues are present with respect to a current situation for creating the swarm ramp, including based on the amount of time; and providing a correction to one or more parameters for creating the swarm ramp, via the processor, when one or more issues are determined to be present.

In another exemplary embodiment, a system is provided that includes one or more sensors configured to obtain biometric information as to one or more individuals who are to assist with manufacturing of a vehicle; a non-transitory computer readable storage medium configured to store operational requirements for the manufacturing of the vehicle; and a processor that is configured to at least facilitate providing instructions for creating a swarm ramp on which the vehicle is to be placed in order to provide an ergonomic work envelope for the one or more individuals, based on the biometric information and the operational requirements.

Also in an exemplary embodiment, the system further includes a plurality of ramp components; and a plurality of autonomous mobile robots (AMRs) that are configured to be coupled to the ramp components; wherein the ramp components are configured to form the swarm ramp by automated movement of the ramp components and nesting of the ramp components together as directed by the AMRs in accordance with the instructions provided by the processor.

Also in an exemplary embodiment, the plurality of ramp components are configured to interlock with one another when nesting to form the swarm ramp.

Also in an exemplary embodiment, the automated movement of the ramp components and the nesting of the ramp components together are both performed at a pre-stage location, and the swarm ramp then travels as a unit to a manufacturing location.

Also in an exemplary embodiment, the automated movement of the ramp components occurs separately for each of the ramp components until the ramp components reach a manufacturing location, and the nesting is then performed at the manufacturing location.

Also in an exemplary embodiment, the swarm ramp is configured based at least in part on heights of the one or more individuals based on the biometric information.

Also in an exemplary embodiment, the swarm ramp is configured also based at least in part on a manufacturing operation working pitch based on the operational requirements.

Also in an exemplary embodiment, the swarm ramp is configured also based at least in part on an operational length, an operational height, a number of ramp components, and designated lead ramp components, follow ramp components, and end ramp components.

Also in an exemplary embodiment, the processor is further configured to at least facilitate calculating an amount of time required for travel of the ramp components to a destination for nesting; and determining an optimized route for travel of the ramp components based on the amount of time.

Also in an exemplary embodiment, the processor is further configured to at least facilitate determining whether any issues are present with respect to a current situation for creating the swarm ramp, including based on the amount of time; and providing a correction to one or more parameters for creating the swarm ramp, via the processor, when one or more issues are determined to be present.

In another exemplary embodiments, a system is provided that includes one or more sensors configured to obtain biometric information, including a height, as to one or more individuals who are to assist with manufacturing of a vehicle; a non-transitory computer readable storage medium configured to store operational requirements for the manufacturing of the vehicle; a processor that is configured to at least facilitate providing instructions for creating a swarm ramp on which the vehicle is to be placed in order to provide an ergonomic work envelope for the one or more individuals, based on the biometric information, including the height of the one or more individuals, and the operational requirements; a plurality of ramp components; and a plurality of autonomous mobile robots (AMRs) that are configured to be coupled to the ramp components; wherein the ramp components are configured to interlock with one another when nesting to form the swarm ramp and to form the swarm ramp by automated movement of the ramp components and nesting of the ramp components together as directed by the AMRs in accordance with the instructions provided by the processor.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
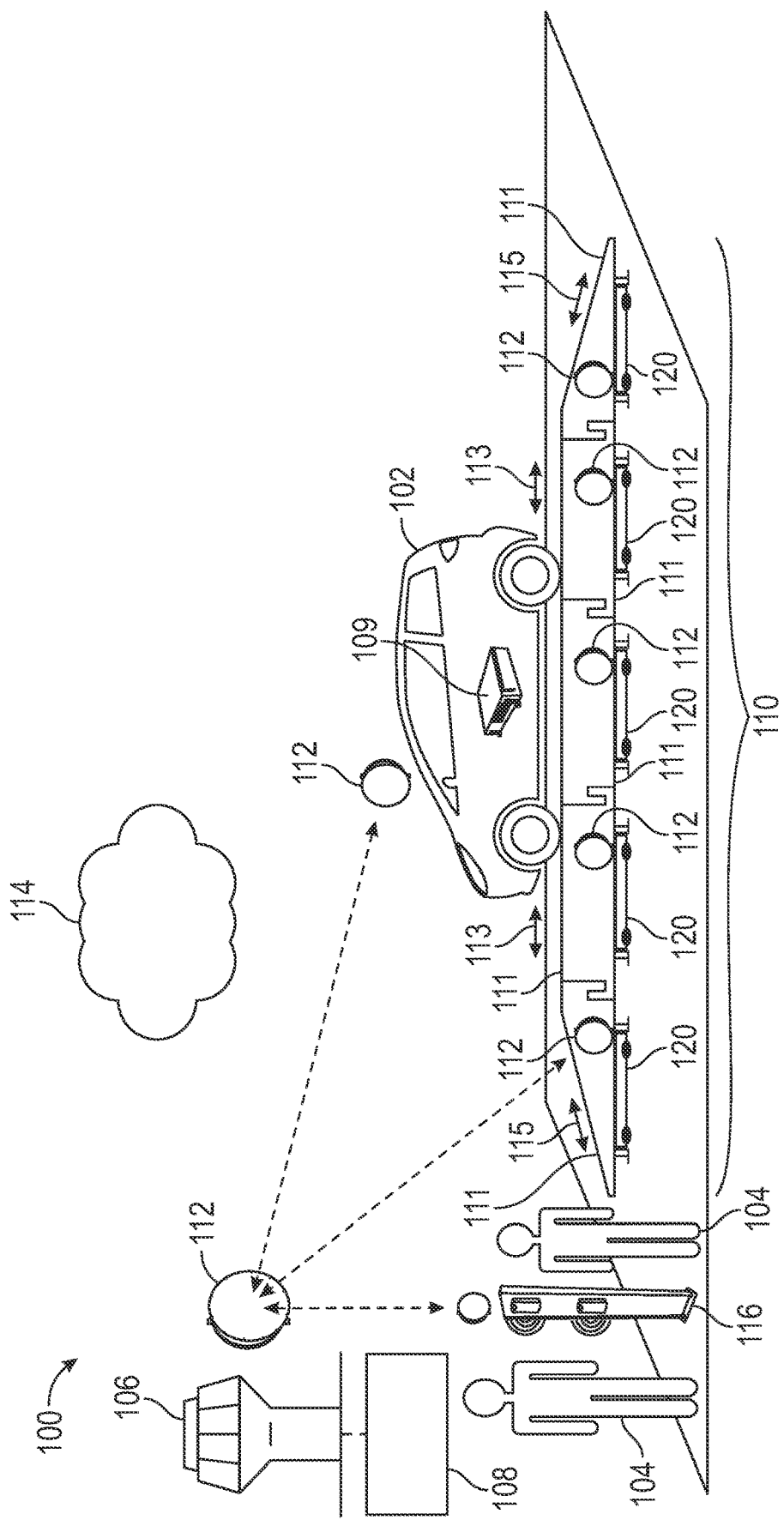
FIG. 1 is a diagram of a system for controlling manufacturing of a vehicle, and that includes the use of an ergonomic swarm ramp with autonomous robot components, in accordance with exemplary embodiments.

FIG. 1 is a diagram of a system 100 for controlling manufacturing of a vehicle 102, in accordance with exemplary embodiments. In various embodiments, the system 100 utilizes an ergonomic swarm ramp with autonomous robot components as set forth in greater detail below, in accordance with exemplary embodiments.

In various embodiments, the vehicle 102 comprises an automobile. The vehicle 102 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 102 may also comprise a motorcycle or other vehicle, such as aircraft, spacecraft, watercraft, and so on, and/or one or more other types of mobile platforms (e.g., a robot and/or other mobile platform).

As explained in greater detail below, in various embodiments, the system 100 provides an ergonomic work environment for individuals (also referred to herein as "operators") 104 who are assisting with manufacturing the vehicle 102. For example, in certain embodiments, the individuals 104 comprise any number of human individuals, such as employees of a manufacturing plant in which the vehicle 102 is manufactured and/or assembled in whole or in part (collectively referred to as "manufacturing" of the vehicle 102 as referred to herein).

Figure 2:
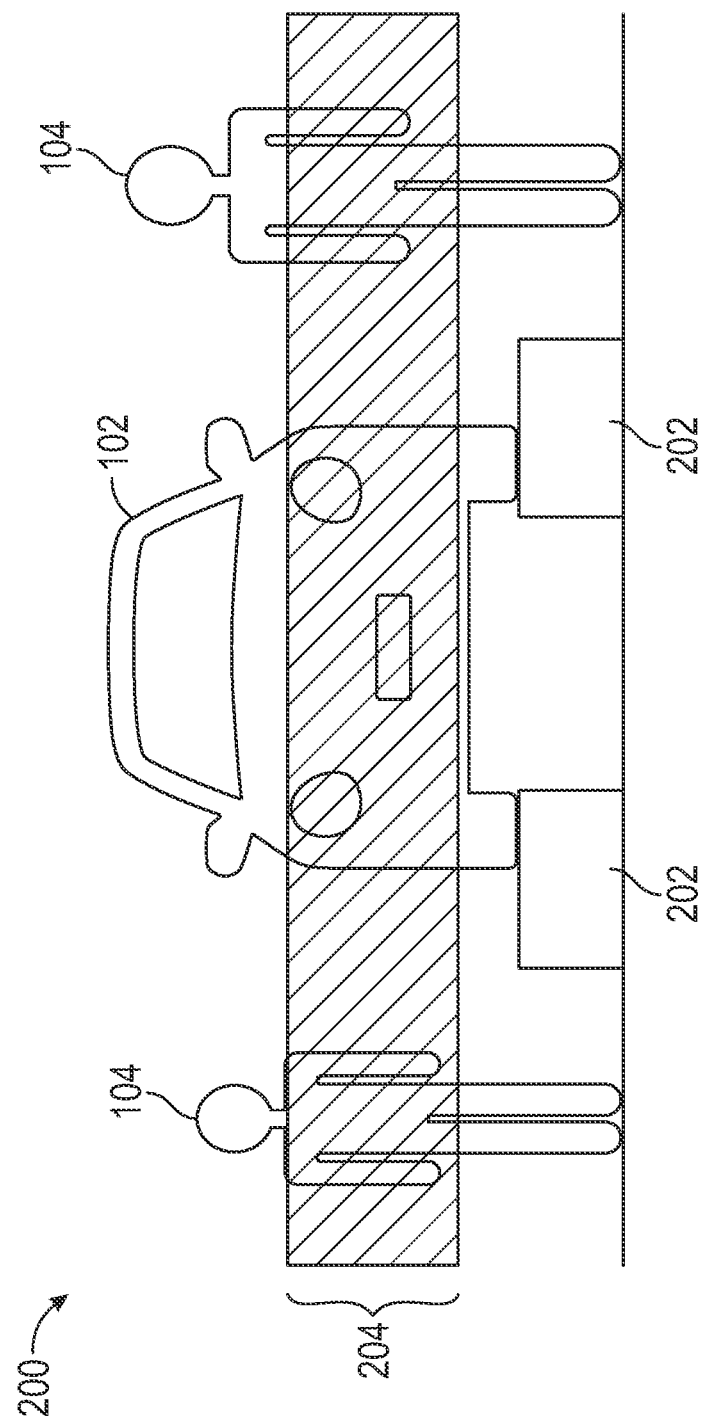
FIG. 2 is a diagram of a working environment that includes an ergonomic work envelope for individuals helping with the manufacture of vehicles, and that can be incorporated into the system of FIG. 1, in accordance with exemplary embodiments.

With reference to FIG. 2, a diagram is provided of a working environment 200 that may be implemented in connection with the system 100 of FIG. 1, in accordance with various embodiments. As depicted in FIG. 2, in various embodiments, to facilitate the working environment that is ergonomically conducive to the individuals 104, one or more platforms 202 are utilized to raise the vehicle 102 to an appropriate height that results in an ergonomic work envelope 204 for the individuals 104. In various embodiments, the ergonomic work envelope 204 satisfies various laws, regulations, safety issues, operator preferences, and/or other ergonomic concerns.

In various embodiments, the ergonomic work envelope 204 provides optimal ergonomic conditions for the individuals, based on the heights of the individuals, the height and/or other dimensions of the vehicle 102, and the type of work that is to be performed at a particular location (e.g., a particular room, cell, or station) in which the individuals 104 are to be assisting with the manufacturing of the vehicle 102, among other conditions. For example, relatively taller individuals 104 may require a relatively higher ergonomic work envelope 204 as compared with relatively shorter individuals 104. By way of additional example, work required on a roof or other relatively higher component of the vehicle 102 (or a relatively higher pitch) may require a relatively higher ergonomic work envelope 204 for the individuals 104 as compared with work on a fender or other relatively lower component of the vehicle 102 (or a relatively lower pitch), and so on.

With reference back to FIG. 1, in various embodiments, the system 100 includes a control center 106, a swarm ramp 110, and one or more biometric identification devices 116. In various embodiments, the system 100 also includes a plurality of transceivers 112 (and/or transmitter and receiver combinations) at each of the control center 106, the vehicle 102, the biometric identification devices 116, and the swarm ramp 110 (and components thereof, as described below). In various embodiments, the transceivers 112 are utilized by the control center 106, the vehicle 102, the biometric identification devices 116, and the swarm ramp 110 for communicating with one another via one or more wireless communications networks 114 to facilitate control of manufacturing of the vehicle 102 in an ergonomically conducive matter for the individuals 104.

In certain embodiments, the control center 106 comprises a control tower or other control location and/or system of a manufacturing plant or facility. As depicted in FIG. 1, in various embodiments, the control center 106 includes a control system 108 that controls manufacturing of the vehicle 102, in whole or in part, using the swarm ramp 110.

Also in various embodiments, the vehicle 102 may include a control system 109 that controls manufacturing of the vehicle 102, in whole or in part, using the swarm ramp 110. In various embodiments, manufacturing of the vehicle 102 may be controlled in whole or in part by either: (a) the control system 108 of the control center 106, (b) the control system 109 of the vehicle 102, and/or (c) the control system 108 of the control center 106 and the control system 109 of the vehicle 102 in combination with one another.

Figure 3:
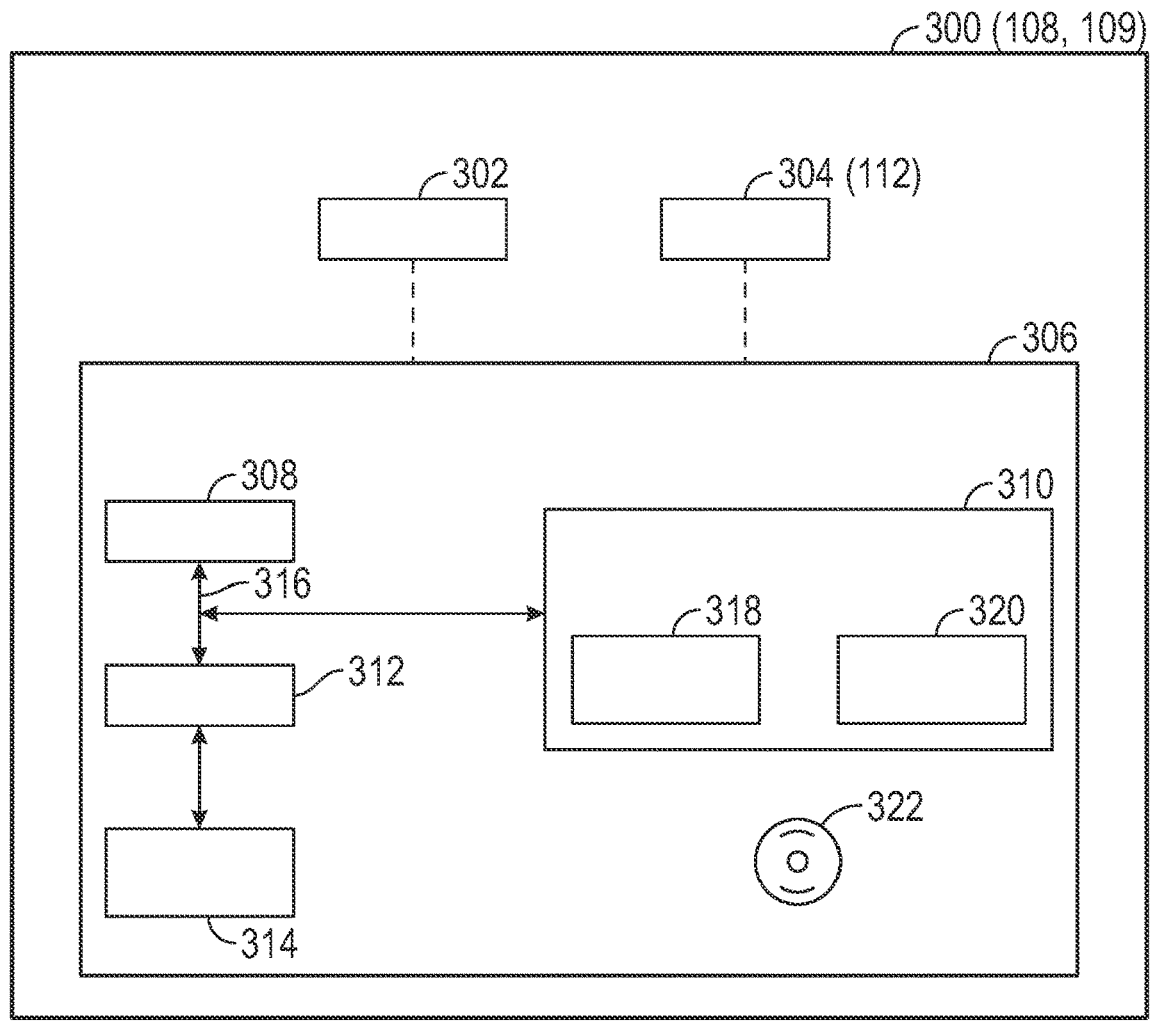
FIG. 3 is a diagram of a control system for controlling manufacturing of a vehicle, and that can be implemented in connection with the system of FIG. 1, in accordance with exemplary embodiments.

With reference now to FIG. 3, an exemplary control system 300 is provided, in accordance with exemplary embodiments. In various embodiments, the control system 300 corresponds to and/or comprises the control system 108 of the control center 106, the control system 109 of the vehicle 102, or both.

As depicted in FIG. 3, in various embodiments, the control system 300 includes one or more sensors 302, along with a transceiver 304 and a controller 306. In certain embodiments, the sensors 302 include one or more cameras, detection sensors (e.g., Lidar, radar, sonar, ultrasonic sensors, or the like) that are configured to obtain sensor data as to the vehicle 102 and the swarm ramp 110 and components thereof, such as for use in alignment of the vehicle 102, the swarm ramp 110, and the components thereof in creating working conditions for the individuals 104 during manufacture of the vehicle 102 of FIG. 1 in accordance with the ergonomic work envelope of FIG. 2.

With continued reference to FIG. 3, in various embodiments, the transceiver 304 corresponds to one or more of the transceivers 112 of FIG. 1. In various embodiments, the transceiver 304 is utilized to communicate with the other transceivers 112 of FIG. 1, including for the sending and receiving of data between the various components of the system 100 of FIG. 1 as to the dimensions of the vehicle 102, the manufacturing requirements for manufacturing of the vehicle 102 (e.g., including operating requirements that include a manufacturing operation working pitch), the biometric information as to the individuals 104, and for utilization thereof via the controller 306 in establishing the swarm ramp 110 in a manner that generates a working environment for the individuals 104 that is in accordance with the ergonomic work envelope 204 of FIG. 1.

As depicted in FIG. 3, in various embodiments, the controller 306 comprises a computer system that includes a processor 308, a memory 310, an interface 312, a storage device 314, and a computer bus 316. The processor 308 performs the computation and control functions of the controller 306, and may comprise any type of processor or multiple processors, single integrated circuits such as a microprocessor, or any suitable number of integrated circuit devices and/or circuit boards working in cooperation to accomplish the functions of a processing unit. During operation, the processor 308 executes one or more programs 318 contained within the memory 310 and, as such, controls the general operation of the controller 306 in executing the methods described herein, such as the method 500 of FIG. 5 and the implementations of FIGS. 6A 6B, 6C and 6D and as described in connection therewith.

The memory 310 can be any type of suitable memory. For example, the memory 310 comprises a non-transitory computer readable storage medium. In the depicted embodiment, the memory 310 stores the above-referenced program 318 along with one or more stored values 320 (e.g., stored biometric information as to the individuals 104 of FIGS. 1 and 2, stored information regarding manufacturing requirements for the vehicle 102, including operating requirements that include a manufacturing operation working pitch, and so on).

The bus 316 serves to transmit programs, data, status and other information or signals between the various components of the computer system of the controller 306.

The storage device 314 can be any suitable type of storage apparatus, including various different types of direct access storage and/or other memory devices. In one exemplary embodiment, the storage device 314 comprises a program product from which memory 310 can receive a program 318 that executes one or more embodiments of the method 500 of FIG. 5 and the implementations of FIGS. 6A 6B, 6C and 6D and as described in connection therewith. In another exemplary embodiment, the program product may be directly stored in and/or otherwise accessed by the memory 310 and/or a secondary storage device (e.g., disk 322), such as that referenced below.

The bus 316 can be any suitable physical or logical means of connecting computer systems and components. This includes, but is not limited to, direct hard-wired connections, fiber optics, infrared and wireless bus technologies. During operation, the program 318 is stored in the memory 310 and executed by the processor 308.

With reference back to FIG. 1, in various embodiments, the biometric identification devices 116 collect biometric information as to the individuals 104. In certain embodiments, each room, station, or cell of a manufacturing facility includes its own individual biometric identification devices 116, so as to collect biometric information from those individuals who are working at the particular room, station, or cell.

In certain embodiments, the biometric identification devices 116 collect information from the individuals 104 via one or types of interactions with the individuals 104. For example, in certain embodiments, the biometric identification devices 116 comprise one or more scanners (e.g., one or more radio frequency identification, or "RFID", scanners) and/or one or more other sensors and/or other devices that are configured to collect information as to the height of the individuals 104 (and, in certain embodiments, other biometric information) from a badge swipe, fob or other device recognition, fingerprint recognition, camera image recognition, and/or other individual specific means for the individuals 104.

In various embodiments, the biometric information is transmitted from the biometric identification devices 116 to the control system 108 and/or the control system 109, which can then store the biometric information in the memory 310 and use the biometric information (in addition to manufacturing requirements for the vehicle 102 that are also stored in the memory 310) in order to arrange the swarm ramp 110 as appropriate to create appropriate ergonomic working conditions for the individuals 104 (i.e., corresponding to the ergonomic work envelope 204 corresponding to the particular individuals 104).

With continued reference to FIG. 1, in various embodiments, the swarm ramp 110 includes a plurality of ramp components 111 that join together and collectively form the platform 202 of FIG. 1. Specifically, in various embodiments, when joined together, the ramp components 111 collectively provide a level platform 113 to allow the individuals to work on the vehicle 102 at the appropriate height corresponding to the ergonomic work envelope 204. In addition, as depicted in FIG. 1, in various embodiments, the ramp components 111, when joined together, also provide inclines 115 on both sides of the level platform 113, in order to allow the vehicle 102 to readily move up to the level platform 113 and down from the level platform 113. In certain embodiments the ramp components 111 are made of plastic; however, this may vary in other embodiments.

As depicted in FIG. 1, in various embodiments, each of the ramp components 111 also has or is coupled to a respective autonomous mobile robot (AMR) 120 and a transceiver 112. As described below, in various embodiments the transceiver 112 is part of or coupled to the AMR 120. Also in various embodiments, each AMR 120 is removably attached to a respective one of the ramp components 111 (in various embodiments, beneath the ramp component 111 as depicted in FIG. 1), and controls and directs the movement, alignment, and nesting thereof based on instructions provided by the control system 108 and/or the control system 109 in order to generate the swarm ramp 110 and provide the ergonomic work envelope 204 for the individuals 104. Also in various embodiments, the AMR 120 is configured to lift and lower a corresponding ramp component 111 when commanded by one or more control systems 300, thereby allowing the weight of the vehicle 102 to be placed on the ramp component 111 rather than the AMR 120.

Figure 4:
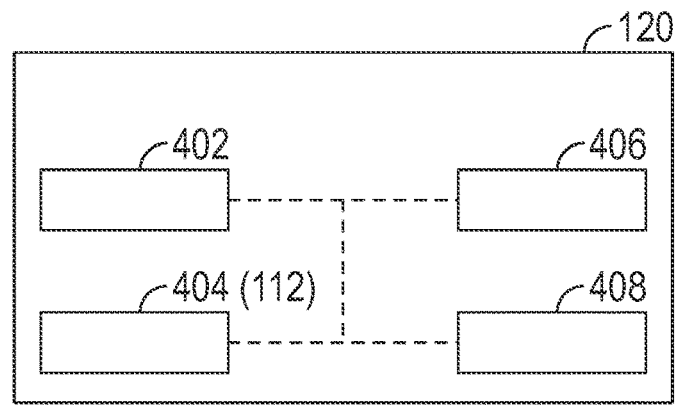
FIG. 4 is a diagram of an exemplary autonomous mobile robot (AMR) that can be utilized in connection with the system of FIG. 1, in accordance with exemplary embodiments.

With reference to FIG. 4, an exemplary AMR 120 of FIG. 1 is depicted, in accordance with an exemplary embodiment. As depicted in FIG. 4, the AMR 120 includes one or more sensors 402, along with a transceiver 404, a processor 406, and a memory 408. In certain embodiments, the sensors 402 include one or more cameras, detection sensors (e.g., Lidar, radar, sonar, ultrasonic sensors, or the like) that are configured to obtain sensor data as to the ramp component 111 and its movement and alignment with other ramp components 111 and/or the vehicle 102. In certain embodiments, the sensors 402 are part of the AMR 120, whereas in other embodiments the sensors 402 are coupled to the AMR 120.

With continued reference to FIG. 4, in various embodiments, the transceiver 404 corresponds to one or more of the transceivers 112 of FIG. 1. In various embodiments, the transceiver 404 is utilized to communicate with the other transceivers 112 of FIG. 1, including for the sending and receiving of data between the various components of the system 100. In certain embodiments, the transceiver 404 is part of the AMR 120, whereas in other embodiments the transceiver 404 is coupled to the AMR 120.

Also in various embodiments, the processor 406 performs the computation and control functions of the AMR 120, and may comprise any type of processor or multiple processors, single integrated circuits such as a microprocessor, or any suitable number of integrated circuit devices and/or circuit boards working in cooperation to accomplish the functions of a processing unit (e.g., similar to the above-described processor 308 of FIG. 3).

In various embodiments, the memory 408 can be any type of suitable memory. In various embodiments, the memory 408 comprises a non-transitory computer readable storage medium. In certain examples, also similar to the memory 310 of FIG. 3, the memory 408 of FIG. 4 may store information such as biometric information as to the individuals 104 of FIGS. 1 and 2, along with stored information regarding manufacturing requirements for the vehicle 102, and so on.

Figure 5:
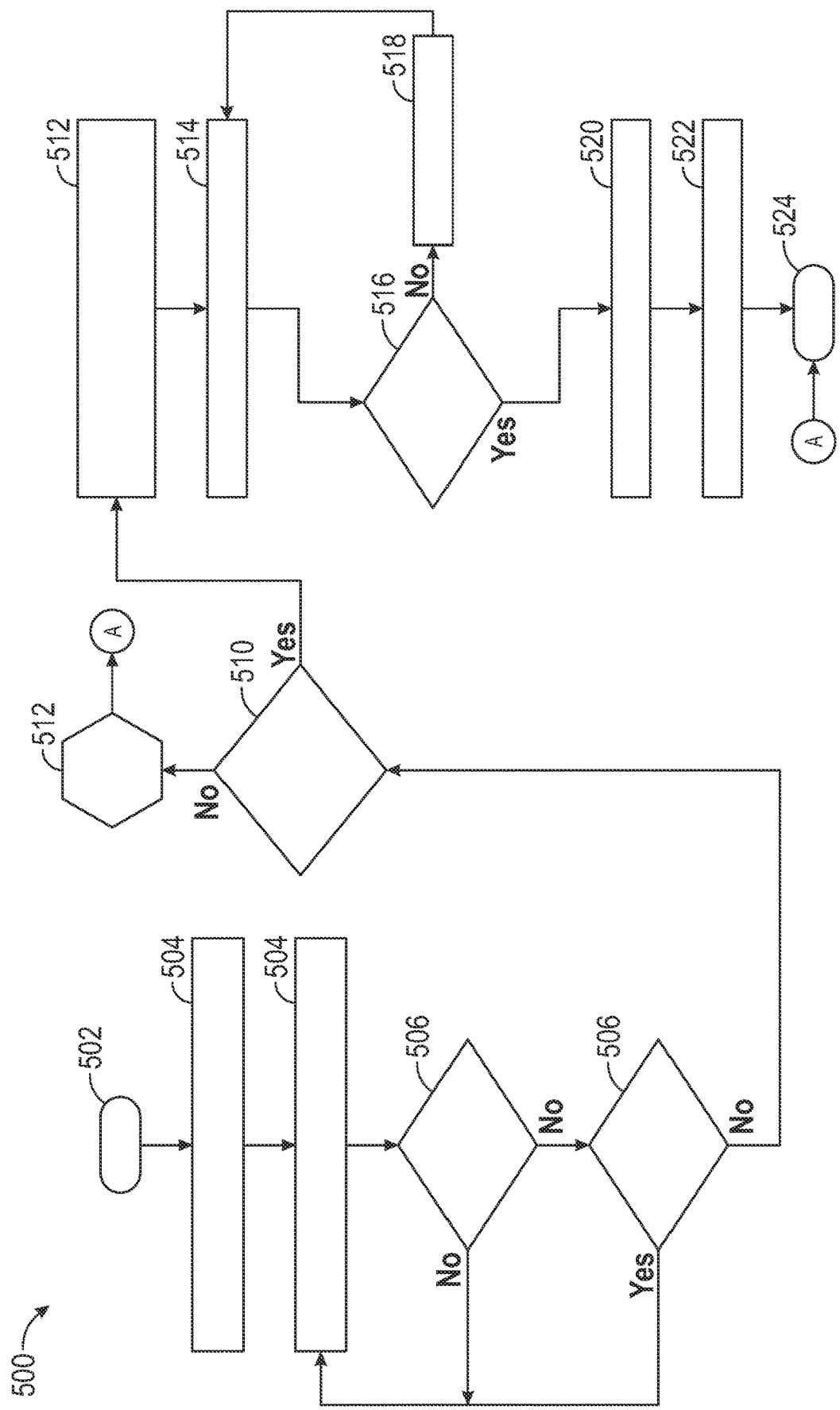
FIG. 5 is a flowchart of a method for controlling manufacturing of a vehicle using an ergonomic swarm ramp with autonomous robot components, and that can be implemented in connection with the system of FIG. 1, the working environment of FIG. 2, the control system of FIG. 3, and AMRs as depicted in FIG. 4, in accordance with exemplary embodiments.

With reference now to FIG. 5, a flowchart is provided of a method 500 for controlling manufacturing of a vehicle using an ergonomic swarm ramp with autonomous robot components, in accordance with exemplary embodiments. In accordance with various embodiments, the method 500 can be implemented in connection with the system 100 of FIG. 1, the working environment 200 of FIG. 2, the control system 300 of FIG. 3, and AMRs 120 as depicted in FIG. 4, in accordance with exemplary embodiments. In addition, the method 500 is also described below in connection with FIGS. 6A, 6B, 6C, and 6D, which depict exemplary implementations thereof in accordance with exemplary embodiments.

As depicted in FIG. 5, in various embodiments the method 500 begins at 502. In various embodiments, the method 500 begin when a vehicle (such as the vehicle 102 of FIG. 1) is ready to be manufactured at a manufacturing facility (such as that of FIG. 1).

In various embodiments, wireless communications are initiated (step 504). Specifically, in various embodiments, wireless communications are initiated and performed among the various components of the system 100 of FIG. 1, including the control center 106, the vehicle 102, and the biometric identification device 116 of FIG. 1 in order to confirm the manufacturing operation that is to be performed for the vehicle 102 (e.g., at this particular location of the manufacturing facility).

Also in various embodiments, one or more operators interface with the biometric identification device 116. Specifically, in certain embodiments, one or more of the individuals 104 of FIG. 1 (e.g., who are assisting with the manufacturing of the vehicle 102) interface with the biometric identification device 116 of FIG. 1 in order to supply biometric information thereto, such as the height of the operators 104 and preferred body characteristics relative to the manufacturing facility and/or relative to the assets environment (HMI).

In various embodiments, a determination is made as to whether a change in operator has occurred (step 506). Specifically, in various embodiments, one or more processors (such as the processor 308 of FIG. 3) determine whether one or more of the individuals 104 who are assisting with the manufacturing of the vehicle 102 (e.g., at the particular location, such as the particular cell, room, or station, of the manufacturing plant) have changed (e.g., with one or more new individuals 104 replacing one or more of the previously individuals 104).

In various embodiments, if it is determined at step 506 that an operator change has occurred, then the process returns to step 504, as the new operator(s) interface with the biometric identification device 116, and biometric information is obtained as to the new operator(s) in a new iteration of step 504.

Once it is determined during an iteration of step 506 that an operator change has not occurred (e.g., that the biometric information has now been obtained for the current operators), then the process proceeds to step 508. In various embodiments, during step 508, a determination is made as to whether a change in architecture has occurred. Specifically, in various embodiments, one or more processors (such as the processor 308 of FIG. 3) determine whether any of the manufacturing requirements for the vehicle 102 and/or equipment to be utilized (e.g., the manufacturing operation working pitch at the particular location, such as the particular cell, room, or station, of the manufacturing plant) have changed.

In various embodiments, if it is determined at step 508 that an architecture change has occurred, then the process returns to step 504, as new information is obtained (e.g., as to preferences of the operators as to the new architecture) in a new iteration of step 504.

Once it is determined during an iteration of step 508 that an architecture change has not occurred (e.g., that the information has now been obtained for the current architecture), then the process proceeds to step 510, described directly below.

In various embodiments, during step 510, a determination is made as to whether a swarm ramp is needed. In various embodiments, during step 510, one or more processors (such as the processor 308 of FIG. 3) determine whether a swarm ramp is needed for the current operators to perform the current manufacturing tasks within the ergonomic work envelope 204 of FIG. 2, given the height and/or other biometric information of the current operators and the manufacturing work required for the vehicle 102 at the present location.

In various embodiments, if it is determined in step 510 that a swarm ramp is not needed, then the process proceeds to step 512, in which a swarm ramp is not created. Specially, during step 512, the one or more processors do not provide instructions for the creation of a swarm ramp. In certain embodiments, the method then terminates at 524.

Conversely, in various embodiments, if it is instead determined in step 510 that swarm ramp is needed, then the process then proceeds instead to step 512. In various embodiments, during step 512, environmental requirements are determined. Specifically, in various embodiments, one or more processors (such as the processor 308 of FIG. 3) determine environmental requirements for the swarm ramp that are necessary for achieving the ergonomic work envelope 204 for the individuals 104. For example, in various embodiments, the environmental requirements for the swarm ramp include operational length, height, width, number of units, types of lead units, types of follow units, types of end units, and so on for the ramp components 111 of the swarm ramp 110 of FIG. 1.

By way of example, in certain embodiments: (i) one or more lead units may comprise one or more ramp components 111 that initiate or lead travel to the desired location (and represent a beginning of the swarm ramp 110); (ii) one or more follow units comprise one or more ramp components 111 that follow behind the lead units and the line up behind the lead units when the swarm ramp 110 is assembled; and (iii) one or more end units comprise one or more ramp components 111 that follow behind the follow units and that line up behind the follow units (and represent an end of the swarm ramp 110) when the swarm ramp 110 is assembled. Also in certain embodiments, the follow units may form or correspond to the level platform 113, whereas the lead units and end units may form or correspond to front and rear inclines 115, respectively; however, this may vary in other embodiments.

Also in various embodiments, further wireless communications are performed (step 514). Specifically, in various embodiments, wireless communications are performed with respect to the various components of the system 100 of FIG. 1 via the transceivers 112 and communications network 114 of FIG. 1, including as to swarm ramp availability, current location of the ramp components 111 and/or other system components, swarm ramp assembly time, communications between the control center 106, the vehicle 102, the biometric identification device 116, and the ramp components 111 and/or associated AMRs 120. Also in various embodiments, the communications of step 514 include communications and an associated algorithm (e.g., retrieved from memory 310 of FIG. 3) in order to plan and determine a route of travel of the ramp components 111 to the desired location and to calculate a time to arrive at the desired location at which the ramp components 111 are to meet and align and nest together to form the swarm ramp 110 (e.g., at a destination for nesting) in accordance with an applicable assembly manufacturing operation broadcast window. In various embodiments, an optimized route for travel of the ramp units is calculated based on the amount of time and the operation broadcast window.

Also in various embodiments, the swarm ramp is configured based on a number of factors that include: heights of the one or more individuals based on the biometric information; a manufacturing operation working pitch based on operational requirements; and a number of other factors that may include, in various embodiments, an operational length, an operational height, a number of ramp components, and designated lead ramp components, follow ramp components, and end ramp components (e.g., as depicted in FIGS. 6A-6D and described further below).

In various embodiments, a determination is made as to whether the current situation is acceptable (step 516). Specifically, in various embodiments, one or more processors (such as the processor 308 of FIG. 3) determine whether, given the calculated travel time and other conditions, the ramp components 111 are expected to be able to travel to the desired location and align and join together into the required swarm ramp 110 that meets the manufacturing and ergonomic requirements within the amount of time allotted (e.g., via the broadcast window).

In various embodiments, if it is determined that the current situation is not acceptable, then the method proceeds to step 518. In various embodiments, during step 518, one or more changes are made to resolve the issues with the present situation. Specifically, in certain embodiments, one or more processors (such as the processor 308 of FIG. 3) resolve the issues by providing instructions for making changes to the operators 104 and/or the manufacturing location and/or requirements, such as by changing one or more algorithm variables (e.g., by changing operators, locations, manufacturing operation component install sequence, and/or via one or more other changes) in a manner that provides a least disruptive solution under the circumstances. In certain embodiments, when biometric results from different operators result in a unique height adjustment, the control system 300 will calculate the best fit and make the adjustment accordingly. In various embodiments, the method then returns to the above-reference step 514 in a new iteration, and steps 514-518 repeat in new iterations until a determination is made during an iteration of step 516 that the current situation is acceptable.

In various embodiments, once it is determined in step 516 that the current situation is acceptable, then the method proceeds to step 520, in which the ramp components travel to their destination. In certain embodiments, the ramp components 111 (e.g., individual swarm ramps or components) travel to a pre-stage location, in order to allow the ramp components 111 to assemble and join together and then to travel as one large unit (i.e., as a combined swarm ramp 110) to the location in which the manufacturing operation is to take place, in accordance with instructions provided by the one or more processors, such as the processor 308 of FIG. 3. Alternatively, in certain embodiments, the ramp components 111 may each individually travel to the location in which the manufacturing operation is to take place, and then assemble themselves and join together to form the swarm ramp 110 at this location, in accordance with instructions provided by the one or more processors, such as the processor 308 of FIG. 3.

In various embodiments, the swarm ramp is utilized for manufacturing the vehicle (step 522). Specifically, in various embodiments, the swarm ramp 110 is generated via the joining together of the ramp components 111, and the vehicle 102 is driven up the swarm ramp 110. In various embodiments, this is performed in accordance with instructions provided by one or more processors, such as the processor 308 of FIG. 3. Also in various embodiments, while the vehicle 102 is on the level platform 113 of the swarm ramp 110, the operators (e.g., the individuals 104) perform their assembly and/or manufacturing tasks while working with the ergonomic work envelope 204 that has been tailored to the specific biometric information as to the individuals 104 and as to the specific manufacturing requirements for the vehicle 102 (e.g., including operating requirements that include a manufacturing operation working pitch). In various embodiments, the method then terminates at 524.

In various embodiments, throughout the method 500 described above, the AMRs 120 are utilized for communications, movement, plant floor safety, and other roles. In various embodiments, the AMRs 120 have the ability for vertical movement to allow for interlocking of the ramp components 111 and to ensure that the ramp components 111 take the weight of the vehicle 102 to the floor and to the AMRs 120 (e.g., to protect AMRs 120 from damage).

With reference to FIGS. 6A, 6B, 6C, and 6D, various implementations are provided for the method 500 of FIG. 5, including the nesting of the ramp components 111 utilized in connection therewith.

Figure 6A:
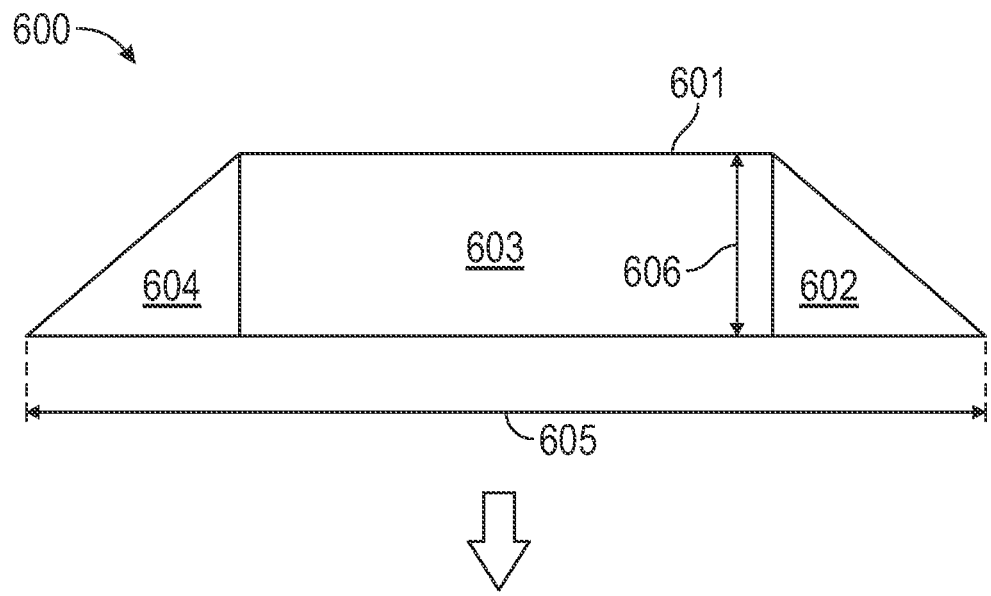
FIGS. 6A, 6B, 6C, and 6D depict exemplary implementations of the method of FIG. 5 using an ergonomic swarm ramp in connection with the system of FIG. 1, the working environment of FIG. 2, the control system of FIG. 3, and AMRs as depicted in FIG. 4, in accordance with exemplary embodiments.

First, with respect to FIG. 6A, a first illustration 600 is provided with respect to an ideal swarm ramp shape 601, in accordance with an exemplary embodiment. As illustrated in FIG. 6A, in an exemplary embodiment, the ideal swarm ramp shape 601 includes a first region 602 with a slope that enables the vehicle 102 to travel upward onto the swarm ramp, a second region 603 that enables to the vehicle 102 to rest upon a level service for manufacturing, and a third region 604 that enables the vehicle 102 to travel downward off the swarm ramp. In various embodiments, the ideal swarm ramp shape 601 is designed based on a working reference height and model of the vehicle 102. Also in various embodiments, a length 605 of the ideal swarm ramp shape 601 is subject to a wheelbase of the vehicle 102, whereas a height 606 of the vehicle 102 is subject to a reference height (e.g., of the vehicle 102 and/or the operators 104).

Figure 6B:
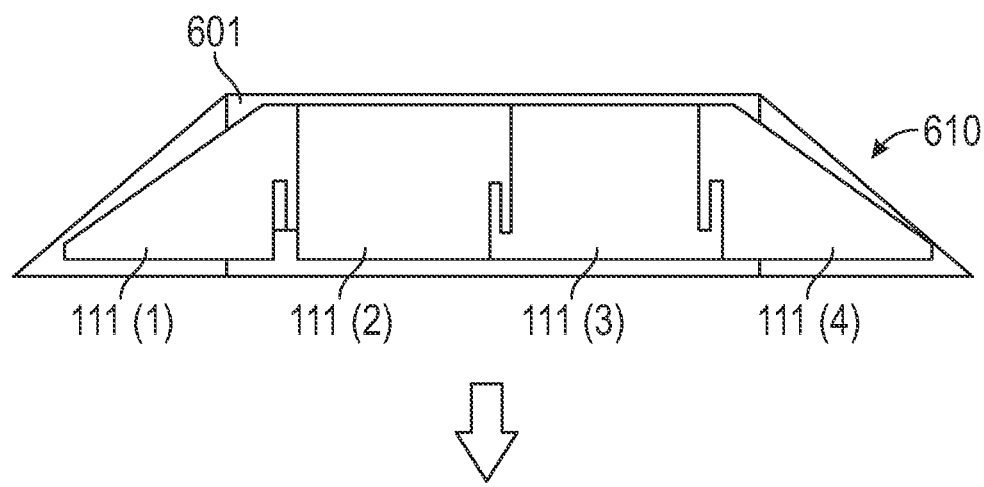

With respect to FIG. 6B, a second illustration 610 is provided as to the nesting of the ramp components 111, in accordance with an exemplary embodiment. Specifically, as illustrated in FIG. 6B, in various embodiments the ramp components 111 are nested together to approximate the ideal swarm ramp shape 601 of FIG. 6A. In addition, also as illustrated in FIG. 6B, in various embodiments the nesting is processed in such a manner that the difference between the actual ramp shape of the resulting swarm ramp 110 and the ideal swarm ramp shape 601 is minimized with available ramp components 111. In various embodiments, this is performed via one or more processors, such as the processor 308 of FIG. 3.

Figure 6C:
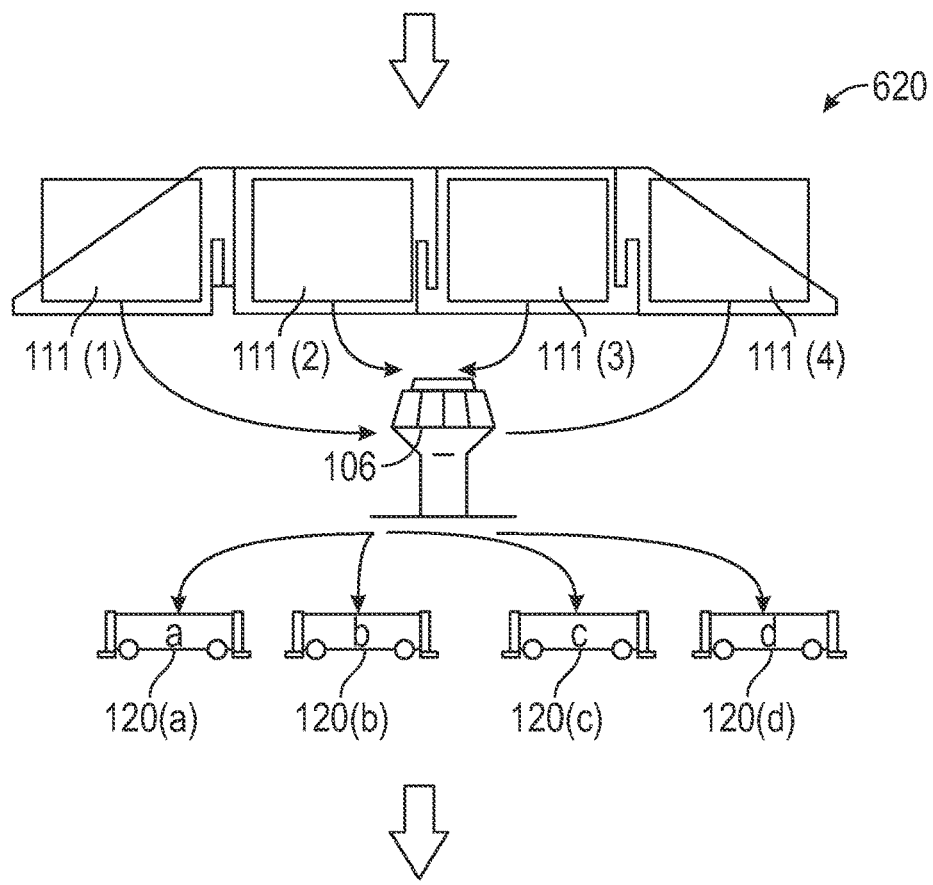

With respect to FIG. 6C, a third illustration 620 is provided as to a fetching order of the ramp components 111 and assignment of AMRs 120 to the ramp components 111. Specifically, as illustrated in FIG. 6C, in various embodiments each ramp component 111 is positioned in the nested ramp shape with a fetching order that is assigned to a respective AMR 120. In various embodiments, the order of nesting of the ramp components 111 may be determined based on a number of factors, such as the height and width of the ramp components 111 as well as the vehicle dimensions, manufacturing requirements, and biometric information as to the individuals 104. Also in various embodiments, this is performed via one or more processors, such as the processor 308 of FIG. 3. (e.g., in one embodiment, via the control center 106 as depicted in FIG. 6C).

Accordingly, in various embodiments as depicted in FIG. 6C: (i) a first ramp component 111(1) is assigned a first position in the nested swarm ramp 110 and is assigned a first AMR 120(a); (ii) a second ramp component 111(2) is assigned a second position in the nested swarm ramp 110 and is assigned a second AMR 120(b); (iii) a third ramp component 111(3) is assigned a third position in the nested swarm ramp 110 and is assigned a third AMR 120(c); and (iv) a fourth ramp component 111(4) is assigned a fourth position in the nested swarm ramp 110 and is assigned a fourth AMR 120(d), and so on. While four ramp components 111 and associated AMRs 120 are depicted in FIG. 6C, it will be appreciated that in various embodiments the swarm ramp 110 may comprise any number of ramp components 111 and associated AMRs 120.

Figure 6D:
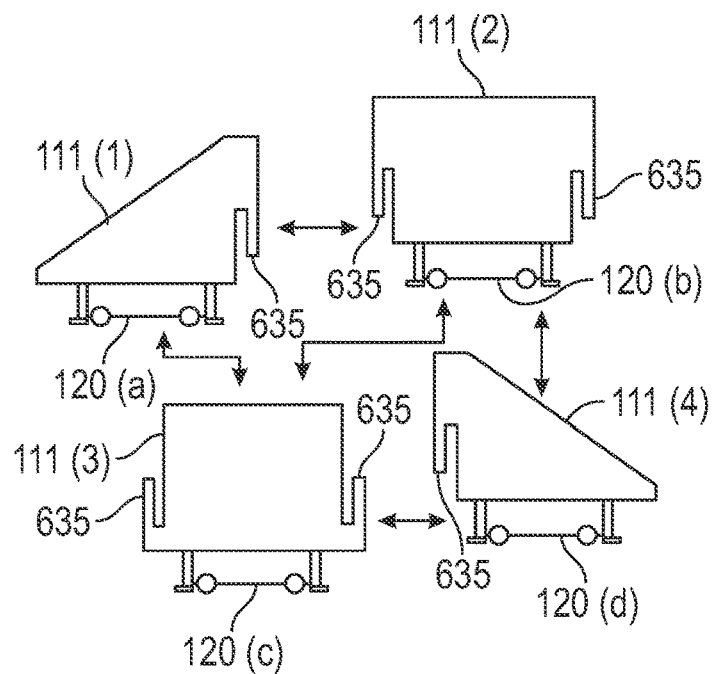

Finally, with respect to FIG. 6D, a fourth illustration 630 is to the forming of an AMR swarm, in accordance with exemplary embodiments. Specifically, as illustrated in FIG. 6D, in various embodiments the AMRs 120 form a swarm in order to pick up, join with, and ultimately control the respective ramp components 111 that are assigned to the respective AMRs 120. For example, as depicted in FIG. 6D, in an exemplary embodiment: (i) the first AMR 120(a) joins and connects with the first ramp component 111(1); (ii) the second AMR 120(b) joins and connects with the second ramp component 111(2); (iii) the third AMR 120(c) joins and connects with the third component 111(3); and (iv)) the fourth AMR 120(d) joins and connects with the fourth ramp component 111(4), and so on. In various embodiments, each AMR 120 is configured to autonomously move its corresponding ramp components 111, including for the travel thereof, nesting with other ramp components 111, and formation of the swarm ramp 110, in accordance with instructions provided by one or more processors. Also in certain embodiments, the AMRs 120 are sequentially operated, thereby allowing the ramp components 111 to be assembled in a desired order for nesting into the completed swarm ramp 110.

In addition, also as illustrated in FIG. 6D, in various embodiments, each of the ramp components 111 include respective mating components 635 that are configured to be joined together when the ramp components 111 form the swarm ramp 110. For example, in various embodiments, the respective mating components 635 lock into place in an interlocking manner when the ramp components 111 are joined together to form the swarm ramp 110. In various embodiments, the mating components 635 providing interlocking functionality with compliance in at least two axes between interlocking ramp components 111, and for example that facilitates connectivity and communication between the ramp components 111.

Accordingly, in various embodiments, methods and systems are provided for controlling manufacturing of a vehicle utilizing a swarm ramp with automated functionality in order to provide an ergonomic work environment for individuals who are operators in the manufacturing process. In various embodiments, one or more processors provide instructions for the creation of a swarm ramp based on biometric information as to one or more individuals assisting with the manufacturing along with manufacturing requirements for the vehicle. Also in various embodiments, the swarm ramp is formed via ramp components that are coupled to and controlled by respective autonomous mobile robots (AMRs) that autonomously move the ramp components to their appropriate location and facilitating the nesting thereof into a swarm ramp that provides an appropriate ergonomic work envelope for the operators based on their biometric information and the manufacturing requirements for the vehicle.

It will be appreciated that the systems, vehicles, methods, and implementations may vary from those depicted in the Figures and described herein. For example, the system 100 of FIG. 1 and components thereof and implementations associated with FIGS. 2-4 may vary in different embodiments. It will similarly be appreciated that the steps of the method 500 of FIG. 5 and the implementations of FIGS. 6A, 6B, 6C, and 6D may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
    obtaining, via one or more sensors, biometric information, including an individual height, as to one or more individuals assisting with manufacturing of a vehicle having a vehicle height;
    obtaining, via a non-transitory computer readable storage medium, operational requirements for the manufacturing of the vehicle, including as to a component height of a component of the vehicle that is being worked on; and
    providing instructions, via a processor, creating a swarm ramp comprising a plurality of ramp components joined together forming a platform on which the vehicle is to be placed at a platform height of a work envelope for the one or more individuals, the platform height based on the vehicle height in addition to the biometric information, including the individual height, and the operational requirements, including the component height.

2. The method of claim 1, wherein the swarm ramp further comprises a plurality of ramp components and a plurality of autonomous mobile robots (AMRs) that are configured to be coupled to the ramp components, and the method further comprises:
    forming the swarm ramp, in accordance with the instructions provided by the processor, by automated movement of the ramp components into position and nesting of the ramp components together as directed by the AMRs, forming the platform at the platform height.

3. The method of claim 2, wherein the automated movement of the ramp components and the nesting of the ramp components together are both performed at a pre-stage location, and the swarm ramp then travels as a unit to a manufacturing location.

4. The method of claim 2, wherein the automated movement of the ramp components occurs separately for each of the ramp components until the ramp components reach a manufacturing location, and the nesting is then performed at the manufacturing location.

5. The method of claim 1, wherein the swarm ramp is configured with the platform height that is also based at least in part on a manufacturing operation working pitch based on the operational requirements.

6. The method of claim 5, wherein the swarm ramp is configured with the platform height that is also based at least in part on an operational length, an operational height, a number of ramp components, and designated lead ramp components, follow ramp components, and end ramp components.

7. The method of claim 2, further comprising:
    calculating, via the processor, an amount of time required for travel of the ramp components to a destination for nesting; and
    determining, via the processor, an optimized route for travel of the ramp components based on the amount of time.

8. The method of claim 7, further comprising:
    determining, via the processor, whether any issues are present with respect to a current situation for creating the swarm ramp, including based on the amount of time; and
    providing a correction to one or more parameters for creating the swarm ramp, via the processor, when one or more issues are determined to be present.

9. A system comprising:
    one or more sensors configured to obtain biometric information, including an individual height, as to one or more individuals assisting with manufacturing of a vehicle having a vehicle height;
    a non-transitory computer readable storage medium configured to store operational requirements for the manufacturing of the vehicle, including as to a component height of a component of the vehicle that is being worked on; and a processor that is configured to at least facilitate providing instructions for creating a swarm ramp comprising a plurality of ramp components joined together forming a platform on which the vehicle is to be placed at a platform height of a work envelope for the one or more individuals, the platform height based on the vehicle height in addition to the biometric information, including the individual height, and the operational requirements, including the component height.

10. The system of claim 9, further comprising:
a plurality of ramp components; and
a plurality of autonomous mobile robots (AMRs) that are configured to be coupled to the ramp components;
wherein the ramp components are configured to form the swarm ramp by automated movement of the ramp components and nesting of the ramp components together as directed by the AMRs, forming the platform at the platform height, in accordance with the instructions provided by the processor.

11. The system of claim 10, wherein the plurality of ramp components are configured to interlock with one another when nesting to form the swarm ramp.

12. The system of claim 10, wherein the automated movement of the ramp components and the nesting of the ramp components together are both performed at a pre-stage location, and the swarm ramp then travels as a unit to a manufacturing location.

13. The system of claim 10, wherein the automated movement of the ramp components occurs separately for each of the ramp components until the ramp components reach a manufacturing location, and the nesting is then performed at the manufacturing location.

14. The system of claim 9, wherein the swarm ramp is configured with the platform height that is also based at least in part on a manufacturing operation working pitch based on the operational requirements.

15. The system of claim 14, wherein the swarm ramp is configured with the platform height that is also based at least in part on an operational length, an operational height, a number of ramp components, and designated lead ramp components, follow ramp components, and end ramp components.

16. The system of claim 9, wherein the processor is further configured to at least facilitate:
calculating an amount of time required for travel of the ramp components to a destination for nesting; and
determining an optimized route for travel of the ramp components based on the amount of time.

17. The system of claim 16, wherein the processor is further configured to at least facilitate:
determining whether any issues are present with respect to a current situation for creating the swarm ramp, including based on the amount of time; and
providing a correction to one or more parameters for creating the swarm ramp, via the processor, when one or more issues are determined to be present.

18. A system comprising:
one or more sensors configured to obtain biometric information, including an individual height, as to one or more individuals assisting with manufacturing of a vehicle having a vehicle height;
a non-transitory computer readable storage medium configured to store operational requirements for the manufacturing of the vehicle, including as to a component height of a component of the vehicle that is being worked on;
a processor that is configured to at least facilitate providing instructions for creating a swarm ramp comprising a plurality of ramp components joined together forming a platform on which the vehicle is to be placed at a platform height of a work envelope for the one or more individuals, the platform height based on the biometric information, including the individual height of the one or more individuals, and the operational requirements, including the component height;
a plurality of ramp components; and
a plurality of autonomous mobile robots (AMRs) that are configured to be coupled to the ramp components;
wherein the ramp components are configured to interlock with one another when nesting to form the swarm ramp and to form the swarm ramp by automated movement of the ramp components and nesting of the ramp components together as directed by the AMRs in accordance with the instructions provided by the processor.

19. The system of claim 18, wherein the swarm ramp is configured with the platform height that is based on a work environment height that is required based on the individual height, the vehicle height, and the component height.

20. The system of claim 19, wherein the swarm ramp is configured with the platform height that is based on a work environment height that is required based on the individual height, the vehicle height, and the component height, such that the one or more individuals are able to reach and work on the component within the work envelope at the work environment height.

* * * * *